US010366088B2

United States Patent
Shastri et al.

(10) Patent No.: US 10,366,088 B2
(45) Date of Patent: Jul. 30, 2019

(54) METHOD AND SYSTEM FOR MINING FREQUENT AND IN-FREQUENT ITEMS FROM A LARGE TRANSACTION DATABASE

(71) Applicant: Infosys Limited, Bangalore (IN)

(72) Inventors: Lokendra Shastri, Bhopal (IN); Zoubin Ghahramani, Cambridge (GB); Jose Miguel Hernandez Lobato, Moralzarzal (ES); Balasubramanian Kanagasabapathi, Erode (IN); Kolandai Swamy Antony Arokia Durai Raj, Pollachi (IN)

(73) Assignee: Infosys Limited, Bangalore (IN)

( * ) Notice: Subject to any disclaimer, the term of this patent is extended or adjusted under 35 U.S.C. 154(b) by 322 days.

(21) Appl. No.: 14/493,706

(22) Filed: Sep. 23, 2014

(65) Prior Publication Data

US 2015/0178303 A1 Jun. 25, 2015

(30) Foreign Application Priority Data

Dec. 20, 2013 (IN) .............................. 5994/CHE/2013

(51) Int. Cl.
*G06F 16/00* (2019.01)
*G06F 16/2457* (2019.01)
(Continued)

(52) U.S. Cl.
CPC .... *G06F 16/24578* (2019.01); *G06F 16/2425* (2019.01); *G06Q 30/06* (2013.01); *G06Q 30/0631* (2013.01)

(58) Field of Classification Search
CPC .......... G06F 16/24578; G06F 16/2425; G06Q 30/0631; G06Q 30/06
See application file for complete search history.

(56) References Cited

U.S. PATENT DOCUMENTS 6,064,980 A * 5/2000 Jacobi ................... G06Q 30/06
                                                      705/1.1
7,328,216 B2   2/2008 Hoffmann et al.
(Continued)

FOREIGN PATENT DOCUMENTS

KR   1020090017835   1/2012

OTHER PUBLICATIONS

English Abstract, Korean Application No. 1020090017835, Jan. 17, 2012.
(Continued)

*Primary Examiner* — Paul Kim
(74) *Attorney, Agent, or Firm* — Klarquist Sparkman, LLP

(57) ABSTRACT

The technique relates to a system and method for mining frequent and in-frequent items from a large transaction database to provide the dynamic recommendation of items. The method involves determining user interest for an item by monitoring short item behavior of at least one user then selecting a local category, a neighborhood category and a disjoint category with respect to the item clicked by the at least one user based on long term preferences data of a plurality of users of the ecommerce environment thereafter selecting one or more frequent and infrequent items from each of the selected local, neighborhood and disjoint category items and finally generating one or more dynamic recommendations based on the one or more items selected from the local category, the neighborhood category and the disjoint category and the one or more selected frequent and infrequent items.

20 Claims, 3 Drawing Sheets

(51) Int. Cl.
*G06Q 30/06* (2012.01)
*G06F 16/242* (2019.01)

(56) References Cited

U.S. PATENT DOCUMENTS

| | | | |
|---|---|---|---|
| 8,909,626 B2 * | 12/2014 | Park | G06F 17/30699 |
| | | | 707/723 |
| 2010/0114663 A1 | 5/2010 | Casas et al. | |
| 2013/0185294 A1 * | 7/2013 | Kami | G06Q 30/02 |
| | | | 707/732 |

OTHER PUBLICATIONS

Zhao et al., Association Rule Mining: A Survey, Technical Report, CAIS, Nanyang Technological University, Singapore, No. 2003116, 2003, 20 pages.

Ding et al., "TCOM, an innovative data structure for mining association rules among infrequent items," *Computers and Mathematics with Applications*, vol. 57, 2009, pp. 290-301.

Koren et al., "Matrix factorization techniques for recommender systems," *Computer*, published by the IEEE Computer Society, 2009, 8 pages.

Zhou et al., "Efficient association rule mining among both frequent and infrequent items," *Science Direct, Computers and Mathematics with Applications*, vol. 54, 2007, pp. 737-749.

\* cited by examiner

METHOD AND SYSTEM FOR MINING FREQUENT AND IN-FREQUENT ITEMS FROM A LARGE TRANSACTION DATABASE

FIELD

The field relates generally to mining frequent and in-frequent items, and in particular, to a system and method for mining frequent and in-frequent items from a large transaction database in an e-commerce environment.

BACKGROUND

The growth and advancement in World Wide Web and e-commerce has triggered the necessity for efficient online personalized recommendation system. The online search websites (e.g. Google, Bing) and e-commerce websites (e.g. Amazon, eBay) recommends the items to the user with other appropriate search criteria or associated items respectively. Recommendation engines use similarities of users and similarities between items to extract the information from large volume of historical transaction data to recommend the items to the user in a more appropriate way. These recommendation helps the retailers to cross-sell/up-sell certain product or service to a customer. Though there are several recommendation engines available which are good at mining information about frequently occurring items however there is very less work done on mining information about infrequent items. Also, the existing methods may be inefficient and may result in low accuracy of prediction and recommendations with respect to in-frequent items. Further, there are no works reported on efficient recommendation by combining frequent and in-frequent items in an ecommerce environment.

In view of forgoing discussion, there is a need for developing efficient methods and systems which mine information about both frequent and infrequent items from the historical transaction data, and personalize recommendation based on users' short-term behavior and long-term preferences.

SUMMARY

The technologies can overcome the limitation mentioned above by mining frequent and in-frequent items from a large transaction database and providing recommendation for frequent and infrequent items in an ecommerce environment, wherein they utilize a hybrid methodology to combine one or more models among matrix factorization methods, Bayesian networks, association rule mining algorithms, and so on to generate frequent and in-frequent items from a transaction database.

According to the present embodiment, a method for mining frequent and in-frequent items from a large transaction database is disclosed. The method involves determining user interest for an item by monitoring short term behavior of at least one user in an ecommerce environment then selecting from a local category, a neighborhood category and a disjoint category with respect to the item clicked by the at least one user based on long term preferences data of a plurality of users of the ecommerce environment. Further, selecting one or more frequent and infrequent items from each of the selected local, neighborhood and disjoint category items by applying one or more algorithms based on one or more data types and finally generating one or more dynamic recommendations based on the one or more items selected from the local category, the neighborhood category and the disjoint category and the one or more selected frequent and infrequent items.

In an additional embodiment, a system for mining frequent and in-frequent items from a large transaction database is disclosed. The system includes a categorization component, a user interest determination module, a categorized item selection module, a frequent and infrequent item selection component and a dynamic recommendation generation component. The categorization component is configured to categorize one or more items into a local category, a neighboring category and a disjoint category with respect to a given item. The user interest determination component is configured to determine user interest for an item by monitoring short term behavior of at least one user in an ecommerce environment. The categorized item selection component is configured to select the local category, the neighborhood category and the disjoint category with respect to the item clicked by the at least one user based on long term preferences data of a plurality of users of the ecommerce environment. The frequent and infrequent items selection component is configured to select one or more frequent and infrequent items from each of the selected local, neighborhood and disjoint category items by applying one or more algorithms based on one or more data types. The dynamic recommendation generation component configured to generate one or more dynamic recommendations based on the one or more items selected from the local category, the neighborhood category and the disjoint category and the one or more selected frequent and infrequent items.

In another embodiment, a non-transitory computer readable medium for mining frequent and in-frequent items from a large transaction database is disclosed. This includes a computer usable medium having a computer readable program code embodied therein for mining frequent and in-frequent items from a large transaction database. The computer program code is adapted to determining user interest for an item by monitoring short term behavior of at least one user in an ecommerce environment then selecting from a local category, a neighborhood category and a disjoint category with respect to the item clicked by the at least one user based on long term preferences data of a plurality of users of the ecommerce environment thereafter selecting one or more frequent and infrequent items from each of the selected local, neighborhood and disjoint category items by applying one or more algorithms based on one or more data types and finally generating one or more dynamic recommendations based on the one or more items selected from the local category, the neighborhood category and the disjoint category and the one or more selected frequent and infrequent items.

DRAWINGS

Various embodiments of the invention will, hereinafter, be described in conjunction with the appended drawings provided to illustrate, and not to limit the invention, wherein like designations denote like elements, and in which.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Figure 1:
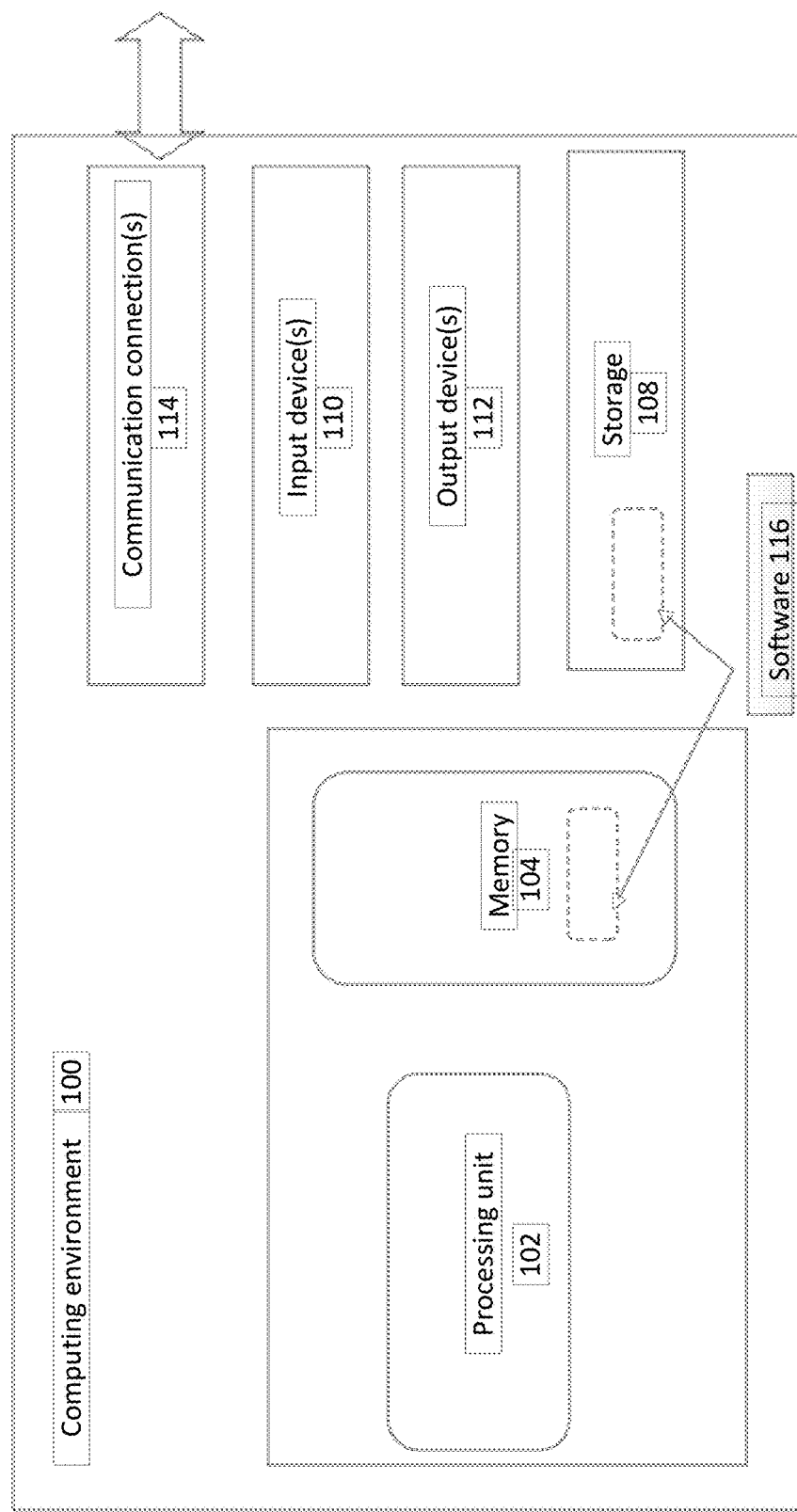
FIG. 1 is a computer architecture diagram illustrating a computing system capable of implementing the embodiments presented herein.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, mini-computers, mainframe computers, a collection of client/server systems, and the like.

With reference to FIG. 1, the computing environment 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
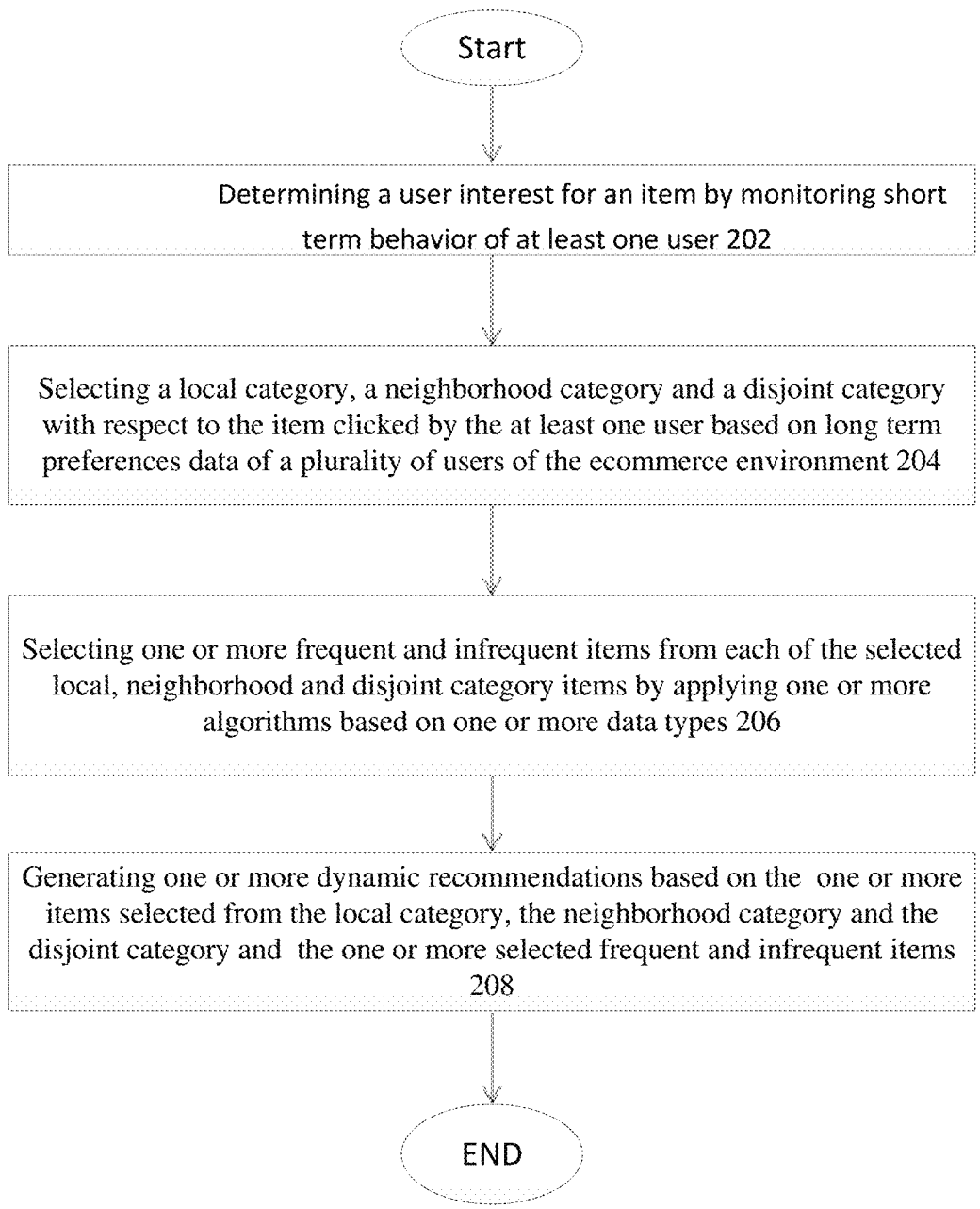
FIG. 2 is a flowchart, illustrating a method for mining frequent and in-frequent items from a large transaction database, in accordance with an embodiment of the present technique.

FIG. 2 is a flowchart, illustrating a method for mining frequent and in-frequent items from a large transaction database, in accordance with an embodiment of the present technique. The user interest for an item is determined by monitoring short term behavior of at least one user in an ecommerce environment 202 then selecting a local category, a neighborhood category and a disjoint category with respect to the item clicked by the at least one user based on long term preferences data of a plurality of users of the ecommerce environment 204 thereafter one or more frequent and infrequent items are selected from each of the selected local, neighborhood and disjoint category items by applying one or more algorithms based on one or more data types 206 and finally one or more dynamic recommendations are generated based on the one or more items selected from the local category, the neighborhood category and the disjoint category and each category comprises of the one or more frequent and infrequent items 208. Further, a feedback is received from the user about the generated recommendation in order to rate the quality of recommendations. The feedback given by the user is used to adapt for future recommendations. The local, neighborhood and disjoint category are predefined in the database.

The long term preferences data mentioned are determined based on historical data of the plurality of users. The present technique is adaptive and robust in handling different types of data and has self-learning capabilities to fine tune the predicting capability based on the feedback from the user.

The short term behavioral data mentioned are determined based on click pattern and navigation pattern of the at least one user. The method further involves refining the recommendation based on long term preferences of the at least one user. The one or more algorithm for selection of one or more frequent and infrequent items from each of the selected local, neighborhood and disjoint category items based on one or more data types comprises clustering algorithm, classification algorithm and correlation algorithm. The one or more dynamic recommendations are generated by using an association rule mining algorithm, a Bayesian sets algorithm, a graph based algorithm, a neighborhood algorithm, a Matrix factorization, a Bayesian network, a dependency network, a Support vector machines or combination thereof. The one or more data types involved are one or more scores, one or more user ratings and one or more actual transaction data. The performance of the algorithm may vary considering the type of data. The method has capability to learn from the input from the users and update the model parameters in the dynamic recommendation generation component 310 in order to generate meaningful dynamic recommendations to the user. The present technique is robust in nature and can handle all types of data with following scales according to an exemplary embodiment of the invention:
   a. Nominal data
      The data represented in a matrix consists of binary values either '0' or '1' to mark the absence or presence of an item; classification of user's (e.g. gender as male and female), classification of products, etc., in a transaction.
   b. Ordinal data
      The data represented in a matrix consists of ratings e.g. rating given by users for different movies or service or webpage.

c. Ratio data

The data represented in a transaction matrix consists of values to measure some metrics which has absolute zero e.g. weight/height of the users, monthly spends of users, and so on.

d. Interval data

The data represented in a matrix consists of values to measure some metrics which does not have absolute zero e.g. body temperature of users, time, and so on.

Depending on the type of data, computation effort required, preference of the user, the metrics preferred by the user, and sparsity of transaction data matrix, any one of the following models for predicting frequent and in-frequent items could be taken into consideration:

i. Base model

The model is used individually and independently, i.e., any one of the following methods such as rule mining algorithms, matrix factorization, and sparse Bayesian classifier models is used.

ii. Mixed models

The mixed models can be any of combination of rule mining algorithms, matrix factorization, and sparse Bayesian classifier models.

iii. Hybrid models or Modified models.

The hybrid models bring together the goodness of different models as listed above.

Figure 3:
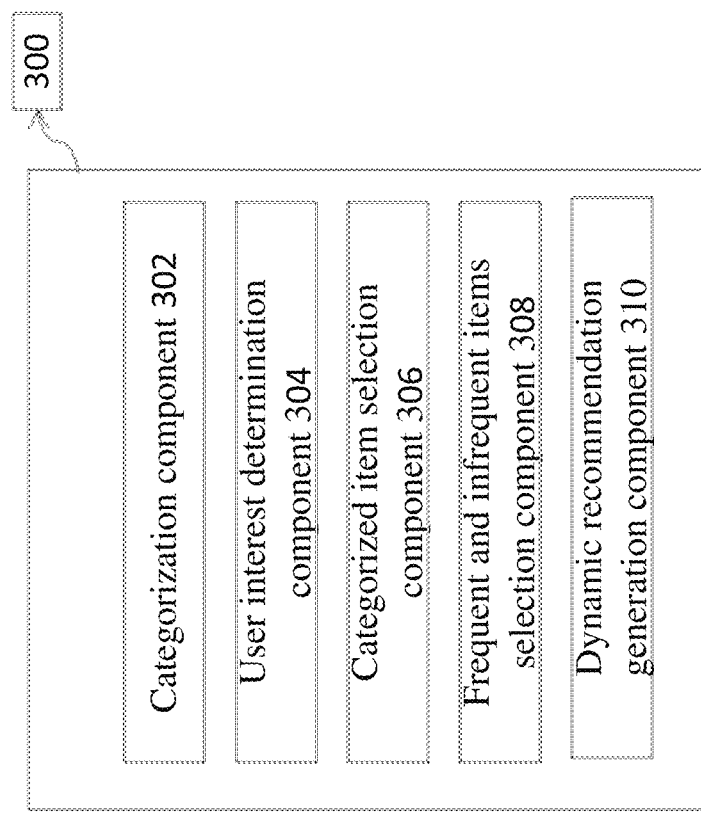
FIG. 3 is a block diagram illustrating a system for illustrating a system mining frequent and in-frequent items from a large transaction database, in accordance with an embodiment of the present technique.

FIG. 3 is a block diagram illustrating a system for mining frequent and in-frequent items from a large transaction database, in accordance with an embodiment of the present technique. More particularly system includes a categorization component 302, a user interest determination component 304, a categorized item selection component 306, a frequent and infrequent items selection component 308 and a dynamic recommendation generation component 310. The categorization component 302 categorizes one or more items into a local category, a neighboring category and a disjoint category with respect to a given item. The user interest determination component 304 determines the user interest for an item by monitoring short term behavior of at least one user in an ecommerce environment. The categorized item selection component 306 selects the local category, the neighborhood category and the disjoint category with respect to the item clicked by the at least one user based on long term preferences data of a plurality of users of the ecommerce environment. The frequent and infrequent items selection component 308 selects one or more frequent and infrequent items from each of the selected local, neighborhood and disjoint category items by applying one or more algorithms based on one or more data types. The dynamic recommendation generation component 310 generates one or more dynamic recommendations based on the one or more items selected from the local category, the neighborhood category and the disjoint category where each category comprises the one or more frequent and infrequent items.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

We claim:

1. A computer implemented method for generating dynamic recommendations comprising:

determining, by a processor, user interest for an item clicked on by at least one user by monitoring short-term behavior of the at least one user in an ecommerce environment, the short-term behavior represented in a click pattern received through a user interface;

selecting, by the processor, a local category, a neighborhood category and a disjoint category with respect to the item clicked by the at least one user based on long-term preferences data of a plurality of users of the ecommerce environment, the local category, the neighborhood category, and the disjoint category being predefined in a transaction database;

determining, by the processor, a plurality of frequent items from each of the selected local, neighborhood, and disjoint categories, wherein an item is identified as a frequent item based on a number of occurrences of the item in the transaction database exceeding a definition set for a frequent item;

for the plurality of determined frequent items, by the processor, providing an identifier identifying the frequent item as a frequent item;

determining, by the processor, a plurality of infrequent items from each of the selected local, neighborhood, and disjoint categories, wherein an item is identified as an infrequent item based on a number of occurrences of the item in the transaction database not exceeding a definition set for an infrequent item;

for the plurality of determined infrequent items, by the processor, providing an identifier identifying the infrequent item as an infrequent item;

selecting, by the processor, one or more frequent and one or more infrequent items from each of the selected local, neighborhood, and disjoint categories by applying a plurality of algorithms based on one or more data types, wherein the plurality of algorithms are selected from clustering algorithms, classification algorithms, and correlation algorithms and the one or more data types comprise nominal data represented in a matrix of binary values marking absence or presence of an item, ordinal data represented in a matrix of ratings given by the plurality of users, ratio data represented in a matrix comprising values of metrics having an absolute zero value, and interval data represented in a matrix comprising values of metrics not having an absolute zero value; and generating, by the processor, one or more dynamic recommendations based on:

the one or more frequent and infrequent items selected from the local category;

the one or more frequent and infrequent items selected from the neighborhood category; and the one or more frequent and infrequent items selected from the disjoint category; and;

displaying the one or more dynamic recommendations to the user, the one or more dynamic recommendations comprising at least one infrequent item.

2. The method as claimed in claim 1, further comprising requesting feedback from the at least one user about the one or more dynamic recommendations.

3. The method as claimed in claim 1, wherein the one or more data types comprise one or more scores, one or more user ratings and one or more actual transaction data.

4. The method as claimed in claim 1, wherein the long-term preferences data are determined based on historical transaction data of the plurality of users.

5. The method as claimed in claim 1, wherein short-term preferences are determined based on click pattern and navigation pattern of the at least one user.

6. The method as claimed in claim 1 further comprising refining the one or more dynamic recommendations based on long-term preferences of the at least one user.

7. The method as claimed in claim 1, wherein the one or more dynamic recommendations are generated by using an association rule mining algorithm, a Bayesian sets algorithm, a graph based algorithm, a neighborhood algorithm, a Matrix factorization, a Bayesian network, a dependency network, a Support vector machines or combination thereof.

8. A system for generating dynamic recommendations comprising:
   a hardware processor in operable communication with a hardware processor readable storage medium, the hardware processor readable storage medium containing one or more programming instructions whereby the hardware processor is configured to implement:
   a categorization component configured to categorize one or more items into a local category, a neighborhood category and a disjoint category with respect to a given item;
   a user interest determination component configured to determine user interest for an item clicked on by at least one user by monitoring short-term behavior of the at least one user in an ecommerce environment;
   a categorized item selection component configured to select from the local category, the neighborhood category and the disjoint category with respect to the given item clicked by the at least one user based on long-term preferences data of a plurality of users of the ecommerce environment;
   a frequent and infrequent items selection component configured to:
      determine a plurality of frequent items from each of the local, neighborhood, and disjoint categories with respect to the given item, wherein an item is identified as a frequent item based on a number of occurrences of the item in a transaction database exceeding a definition set for a frequent item;
      for the plurality of determined frequent items, provide an identifier identifying the frequent item as a frequent item;
      determine a plurality of infrequent items from each of the local, neighborhood, and disjoint categories with respect to the given item, wherein an item is identified as an infrequent item based on a number of occurrences of the item in the transaction database not exceeding a definition set for an infrequent item;
      for the plurality of determined infrequent items, provide an identifier identifying the infrequent item as an infrequent item; and
      select one or more frequent and infrequent items from each of the selected local, neighborhood and disjoint categories by applying one or more algorithms based on one or more data types, wherein the one or more data types comprise one or more scores, one or more user ratings, and actual transaction data; and
   a dynamic recommendation generation component configured to generate one or more dynamic recommendations based on the one or more items selected from the local category, the neighborhood category and the disjoint category and the one or more selected frequent and infrequent items, the one or more dynamic recommendations comprising at least one infrequent item.

9. The system as claimed in claim 8, further comprising a feedback request component configured to request feedback from the at least one user about the one or more dynamic recommendations.

10. The system as claimed in claim 8, wherein the long-term preferences data are determined based on historical transaction data of the plurality of users.

11. The system as claimed in claim 8, wherein short-term preferences are determined based on click pattern and navigation pattern of the at least one user.

12. The system as claimed in claim 8, further comprising a recommendation refining component configured to refine the one or more dynamic recommendations based on long-term preference of the at least one user.

13. The system as claimed in claim 8, wherein the one or more algorithms comprises clustering algorithm, classification algorithm and correlation algorithm.

14. The system as claimed in claim 8, wherein the one or more dynamic recommendations are generated by using an association rule mining algorithm, a Bayesian sets algorithm, a graph based algorithm, a neighborhood algorithm, a Matrix factorization, a Bayesian network, a dependency network, a Support vector machines or combination thereof.

15. A non-transitory computer readable medium having stored thereon instructions for generating dynamic recommendation, comprising machine executable code which when executed by at least one processor, causes the at least one processor to perform steps comprising:
   determining user interest for an item clicked on by at least one user by monitoring short-term behavior of the at least one user;
   selecting a plurality of categories with respect to the item clicked by the at least one user based on long-term preferences data of a plurality of users, the plurality of categories being defined in a transaction database;
   determining a plurality of frequent items from each of the plurality of categories, wherein an item is identified as a frequent item based on a number of occurrences of the item in the transaction database exceeding a definition set for a frequent item;
   for the plurality of determined frequent items, providing an identifier identifying the frequent item as a frequent item;
   determining a plurality of infrequent items from each of the plurality of categories, wherein an item is identified as an infrequent item based on a number of occurrences of the item in the transaction database not exceeding a definition set for an infrequent item;
   for the plurality of determined infrequent items, providing an identifier identifying the infrequent item as an infrequent item;
   selecting one or more frequent and infrequent items from each of the plurality of categories by applying one or more algorithms based on one or more data types, wherein the one or more data types comprise one or more scores, one or more user ratings, and actual transaction data; and
   generating one or more dynamic recommendations based on the one or more items selected from the one or more selected frequent and infrequent items from each of the plurality of categories, the one or more dynamic recommendations comprising at least one infrequent item.

16. The non-transitory computer readable medium as claimed in claim 15 wherein the steps further comprise requesting feedback from the at least one user about the one or more dynamic recommendations.

17. The non-transitory computer readable medium as claimed in claim 15, wherein the one or more algorithms comprise one or more selected from the group consisting of: clustering algorithm, classification algorithm and correlation algorithm.

18. The non-transitory computer readable medium as claimed in claim 15, wherein the one or more dynamic recommendations are generated by using an association rule mining algorithm, a Bayesian sets algorithm, a graph based algorithm, a neighborhood algorithm, a Matrix factorization, a Bayesian network, a dependency network, a Support vector machines or combination thereof.

19. The non-transitory computer readable medium of claim 16, further comprising adjusting long-term preference settings of the user based on the feedback, wherein the long-term preference settings are used to refine recommendations to the user.

20. The method of claim 2, further comprising adjusting long-term preference settings of the user based on the feedback, wherein the long-term preference settings are used to refine recommendations to the user.

* * * * *